(12) United States Patent
Hodatsu et al.

(10) Patent No.: US 8,641,097 B2
(45) Date of Patent: Feb. 4, 2014

(54) PRETENSIONER, SEAT BELT RETRACTOR WITH PRETENSIONER, AND SEAT BELT UNIT INCLUDING SEAT BELT RETRACTOR

(75) Inventors: Yuichiro Hodatsu, Tokyo (JP); Hiroshi Tomita, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/397,894

(22) Filed: Feb. 16, 2012

(65) Prior Publication Data

US 2012/0212030 A1 Aug. 23, 2012

(30) Foreign Application Priority Data

Feb. 21, 2011 (JP) .................................. 2011-034179

(51) Int. Cl.
*B60R 22/36* (2006.01)
(52) U.S. Cl.
USPC ............................. 280/806; 280/807; 297/474
(58) Field of Classification Search
USPC ............ 280/806, 807; 297/474, 475; 242/374
See application file for complete search history.

(56) References Cited

U.S. PATENT DOCUMENTS

| | | | |
|---|---|---|---|
| 5,458,369 A * | 10/1995 | Matsuki et al. | 280/806 |
| 5,875,634 A | 3/1999 | Wohlenberg et al. | |
| 6,363,722 B1 | 4/2002 | Takehara et al. | |
| 6,729,649 B1 * | 5/2004 | Schmidt | 280/805 |
| 7,953,532 B2 * | 5/2011 | Odate et al. | 701/45 |
| 2010/0025977 A1 * | 2/2010 | Tomita | 280/806 |
| 2012/0032016 A1 * | 2/2012 | Tomita et al. | 242/374 |

FOREIGN PATENT DOCUMENTS

| | | |
|---|---|---|
| DE | 198 52 377 A1 | 5/2000 |
| JP | 02-147457 | 6/1990 |
| JP | 06-298040 | 10/1994 |
| JP | 06-298041 | 10/1994 |
| JP | 2001-063520 | 3/2001 |
| JP | 2001-233172 | 8/2001 |
| JP | 2002-331911 | 11/2002 |

OTHER PUBLICATIONS

Extended European Search Report; EP Application No. 12001104.4-1503; Feb. 21, 2013; 6 pgs.

* cited by examiner

*Primary Examiner* — James English
(74) *Attorney, Agent, or Firm* — Foley & Lardner LLP

(57) ABSTRACT

There is provided a pretensioner. The pretensioner includes: a pipe; a gas generator that generates a gas in the pipe in an emergency case; a gas generator mount on which the gas generator is mounted; a spool driving mechanism that rotates a spool in a direction to retract a seatbelt by the gas generated by the gas generator in the emergency case; a discharge hole formed in the pipe so as to allow communication between inside and outside of the pipe; and a blocking member configured to block the discharge hole from inside of the pipe, the blocking member being configured to open the discharge hole when the blocking member is pressed from outside of the pipe with a pressing force equal to or greater than a given pressing force.

12 Claims, 10 Drawing Sheets

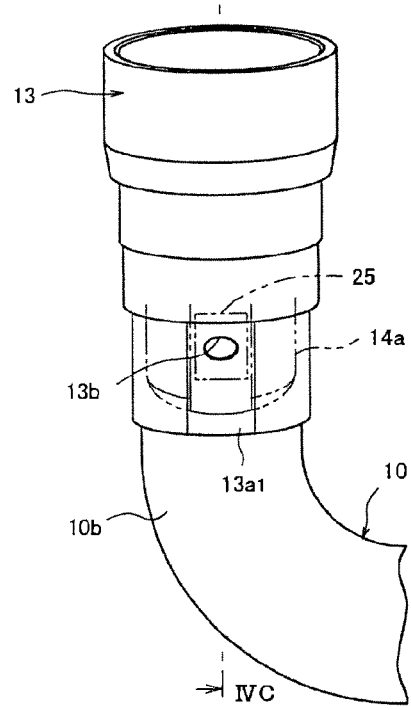
Fig. 4 (a)
Fig. 4 (b)
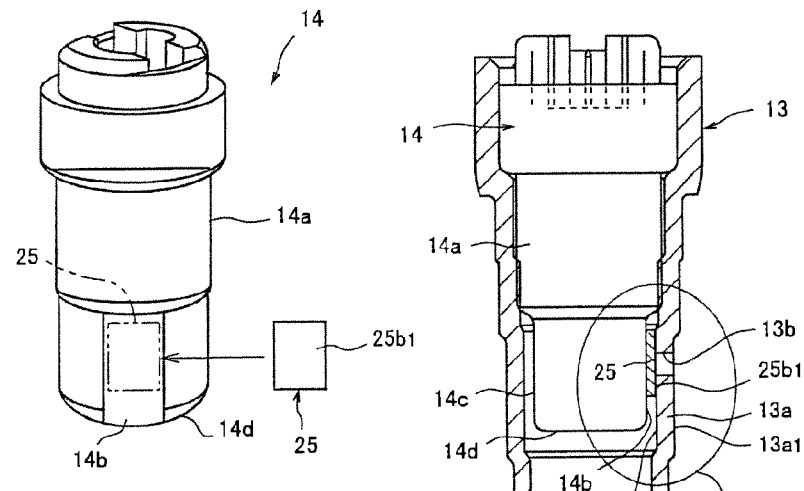
Fig. 4 (c)
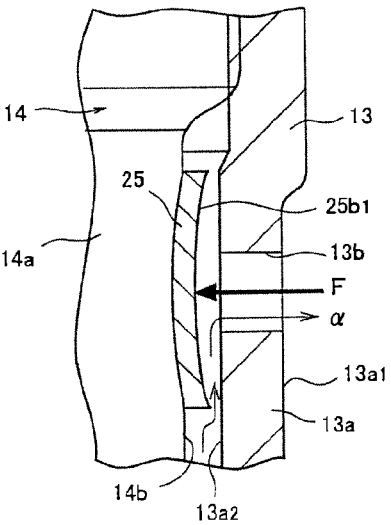
Fig. 4 (d)

PRETENSIONER, SEAT BELT RETRACTOR WITH PRETENSIONER, AND SEAT BELT UNIT INCLUDING SEAT BELT RETRACTOR

CROSS-REFERENCE TO RELATED APPLICATION

This application claims priority from Japanese Patent Application No. 2011-034179, filed on Feb. 21, 2011, the entire contents of which are hereby incorporated by reference.

BACKGROUND

1. Technical Field

Embodiments described herein relate to a pretensioner, a seatbelt retractor, and a seatbelt unit that activates the seatbelt retractor.

2. Related Art

Various seatbelt retractors that include a pretensioner have thus far been developed for use in a seatbelt unit provided in a vehicle such as an automobile. The pretensioner is configured so as to rotate a spool of the seatbelt retractor in a direction to retract the seatbelt with a gas generated by a gas generator at an initial stage of an emergency case, to thereby take up the seatbelt around the spool. This action quickly removes slack of the seatbelt and gives higher tension to the seatbelt, thus increasing the restraining force of the seatbelt with respect to the occupant.

An example of conventional pretensioners includes a plurality of force transmission members composed of balls accommodated in a pipe, and the force transmission members are made to move by the pressure of the gas generated by the gas generator inside of the pipe, so as to be pressed against a plurality of pressure-receiving portions formed of a lever of a link gear, so that the spool is made to rotate in the direction to retract the seatbelt by the rotation of the link gear (for example, see JP-A-2001-63520).

In the pretensioner according to JP-A-2001-63520, the pipe includes an hole that allows communication between outside and inside of the pipe, and the hole is blocked by a blocking member. In the case where the gas pressure inside of the pipe excessively increases so as to exceed a predetermined pressure during the operation of the pretensioner, the excessive gas pressure acts to remove the blocking member so as to open the hole, thereby discharging the gas out of the pipe.

Recently, usable parts of vehicles that include a pretensioner that has been activated in an emergency case are required to be recycled. However, in general, a considerable gas pressure resides in the pipe after the pretensioner is activated. Such a residual gas pressure in the pipe makes it difficult to demolish the vehicle to recycle the usable parts. Accordingly, it is necessary to discharge the gas inside of the pipe before demolishing the vehicle.

A technique of discharging the gas out of the pipe is disclosed in JP-A-2001-63520. However, the technique of discharging the gas according to JP-A-2001-63520 is only intended to discharge the gas utilizing the gas pressure when the gas pressure inside of the pipe excessively increases so as to exceed the predetermined pressure. Accordingly, in the case where the gas pressure inside of the pipe has not increased beyond the predetermined pressure during the operation of the pretensioner, the gas pressure resides in the pipe after the operation of the pretensioner is finished, unless a piston is removed from the pipe. Therefore, the technique of discharging the gas according to JP-A-2001-63520 is unsuitable for solving the foregoing problem. When the pretensioner is activated, actually the gas pressure inside of the pipe often remains below the predetermined pressure during the operation of the pretensioner.

SUMMARY OF THE INVENTION

One of illustrative aspects of the present invention is to provide a pretensioner from which a gas residing in a pipe can be easily discharged out of the pipe after the operation of the pretensioner is finished, a seatbelt retractor with the pretensioner, and a seatbelt unit including the seatbelt retractor.

According to one or more illustrative aspects of the present invention, there is provided a pretensioner. The pretensioner includes: a pipe; a gas generator that generates a gas in the pipe in an emergency case; a gas generator mount on which the gas generator is mounted; a spool driving mechanism that rotates a spool in a direction to retract a seatbelt by the gas generated by the gas generator in the emergency case; a discharge hole formed in the pipe so as to allow communication between inside and outside of the pipe; and a blocking member configured to block the discharge hole from inside of the pipe, the blocking member being configured to open the discharge hole when the blocking member is pressed from outside of the pipe with a pressing force equal to or greater than a given pressing force.

Other aspects and advantages of the present invention will be apparent from the following description, the drawings and the claims.

The pretensioner configured as above according to the present invention includes the blocking member that blocks the discharge hole of the pipe from inside thereof and opens the discharge hole upon being moved by a pressing force greater than the predetermined pressing force from outside of the pipe. Such a configuration allows, the gas inside of the pipe to be easily discharged outwardly, simply by pressing the blocking member thereby opening the discharge hole, after the operation of the pretensioner.

In particular, the generated gas serves to press the blocking member in the direction to more air-tightly block the discharge hole, and hence the blocking member can more effectively block the discharge hole during the operation of the pretensioner. Such an arrangement suppresses the pressure loss of the generated gas and allows the occupants to be more effectively restrained.

Providing the fitting portion and the blocking portion on the blocking member separately from each other enables the fitting portion to more effectively support the blocking member, and allows the blocking portion to more effectively block the discharge hole. In addition, forming the blocking projection that intrudes into the discharge hole on the blocking portion allows the discharge hole to be more air-tightly blocked.

Further, the seatbelt retractor and the seatbelt unit according to the present invention include the pretensioner according to the present invention. Accordingly, the gas inside of the gas generator mount and the pipe can be easily discharged outwardly after the operation of the pretensioner. Consequently, the vehicle such as an automobile including the pretensioner that has been activated can be easily demolished to recycle the parts used in the vehicle.

BRIEF DESCRIPTION OF THE DRAWINGS

FIG. 4(a) is a schematic perspective view showing a gas generator and a blocking member according to the first example;

FIG. 4(b) is a perspective view showing a gas generator mount according to the first example;

FIG. 4(c) is a cross-sectional view taken along a line IVC-IVC in FIG. 4(b);

FIG. 4(d) is an enlarged fragmentary cross-sectional view of a portion IVD in FIG. 4(c).

DETAILED DESCRIPTION OF EXEMPLARY EMBODIMENTS

Hereafter, exemplary embodiments of the present invention will be now described with reference to the drawings.

Figure 1:
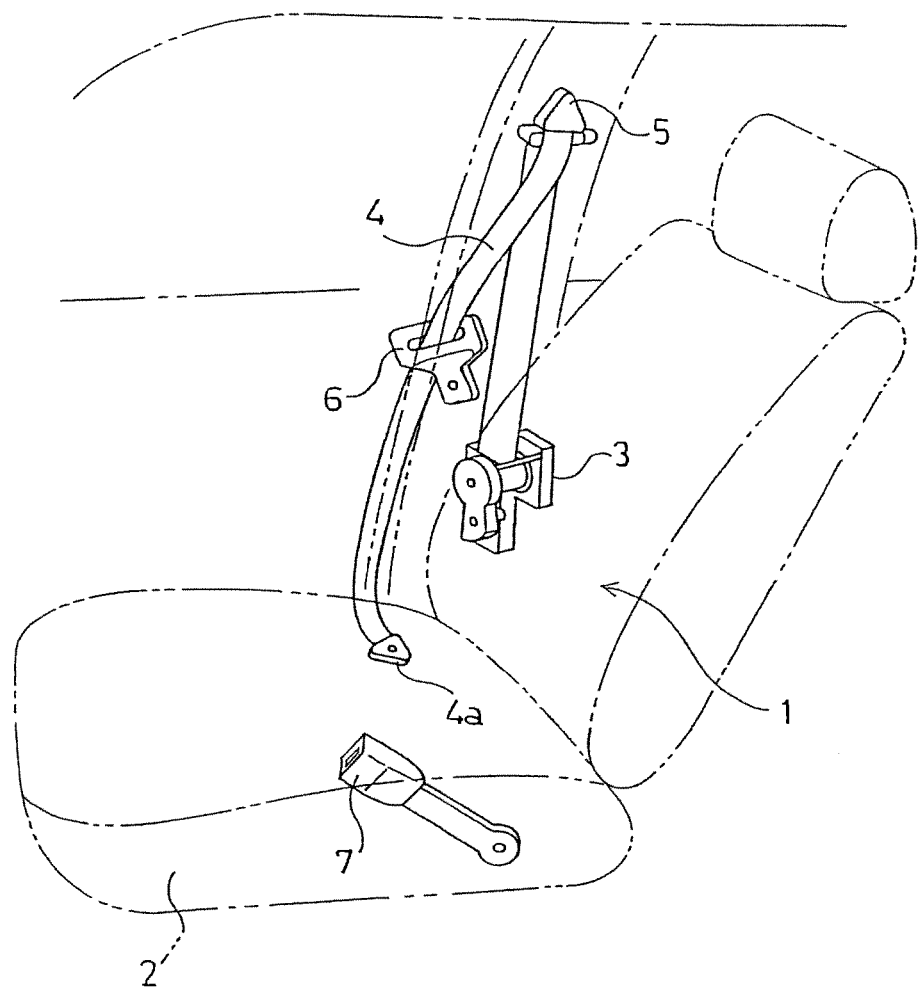
FIG. 1 is a schematic perspective view showing a seatbelt unit including a seatbelt retractor with a pretensioner according to a first example of an embodiment of the present invention.

FIG. 1 is a schematic perspective view showing a seatbelt unit including a seatbelt retractor with a pretensioner according to a first example of the embodiment of the present invention.

As shown in FIG. 1, the seatbelt unit 1 according to the first example is basically the same as a conventionally known three-point seatbelt unit. In FIG. 1, a reference numeral 1 designates the seatbelt unit, 2 designates a vehicle seat, 3 designates a seatbelt retractor located close to the vehicle seat 2, 4 designates a seatbelt that can be withdrawably retracted in the seatbelt retractor 3 and including a belt anchor 4a attached to a leading end thereof via which the seatbelt 4 is fixed to the vehicle floor or the vehicle seat 2, 5 designates a guide anchor that guides the seatbelt 4 withdrawn from the seatbelt retractor 3 to a shoulder of the occupant, 6 designates a tongue slideably supported by the seatbelt 4 extending from the guide anchor 5, and 7 designates a buckle fixed to the vehicle floor or the vehicle seat 2 and in which the tongue 6 is to be removably inserted for connection.

The fastening and releasing operation of the seatbelt 4 of the seatbelt unit 1 is also the same as that of the conventionally known seatbelt unit.

The seatbelt retractor 3 according to the first example may be either a conventionally known emergency locking seatbelt retractor (ELR) or a conventionally known automatic locking seatbelt retractor (ALR). The seatbelt retractor 3 includes a pretensioner. The pretensioner is activated, as a conventionally known pretensioner is, in an emergency case such as collision in which a deceleration far greater than that experienced during a normal driving has been applied to a vehicle, so as to rotate a spool (not shown) of the seatbelt retractor 3 in a direction to retract the seatbelt (hereinafter, seatbelt retracting direction) to thereby take up the seatbelt 4 by a predetermined length thus increasing the restraining force of the seatbelt with respect to the occupant.

Figure 2:
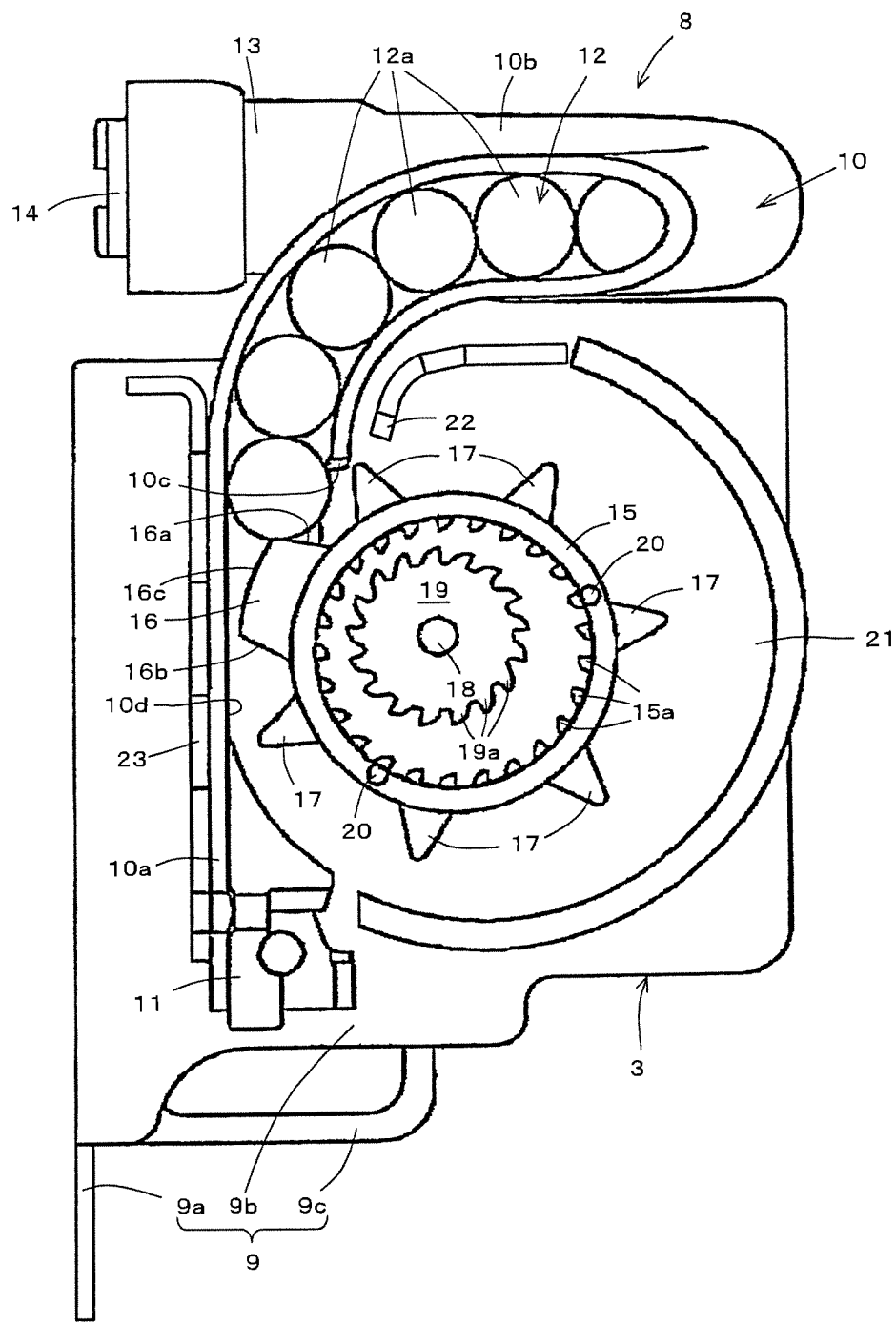
FIG. 2 is a partially cut away side view of the seatbelt retractor and the pretensioner according to the first example shown in FIG. 1.

FIG. 2 is a partially cut away side view of the seatbelt retractor including the pretensioner according to the first example shown in FIG. 1.

As shown in FIG. 2, the pretensioner 8 according to the first example is supported by a frame 9 of the seatbelt retractor 3. The frame 9 includes a base portion 9a located on the side of the vehicle chamber (left side in FIG. 2) so as to be attached to the vehicle body, and a pair of side walls 9b, 9c formed by bending a portion of the base portion 9a.

The pretensioner 8 includes a pipe 10, and a guide member 11 is provided at a leading end portion 10a of the pipe 10. The leading end portion 10a of the pipe 10 and the guide member 11 are attached to a pipe mount 23 fixed to the side wall 9b with a fixture such as a bolt. A cutaway portion 10c is formed on the leading end portion 10a of the pipe 10, so as to allow communication between inside and outside of the pipe 10 and extending in a longitudinal direction of the pipe 10.

The pipe 10 stores therein a plurality of balls 12a made of a metal such as iron or aluminum, and a plurality of force transmission members 12 constituted of a piston (not shown) that presses the balls 12a with a gas pressure, the balls 12a and the force transmission members 12 being movable and disposed in contact with each other. A base end portion 10b of the pipe 10 is formed in a larger diameter than the force transmission member storage portion of the pipe 10, and constitutes a gas generator mount 13. A gas generator 14 is mounted on the gas generator mount 13.

The pretensioner 8 includes a case body (not shown) attached to the side wall 9b of the frame 9. The case body includes a link gear 15 mounted so as to rotate and to move to the right in FIG. 2. The link gear 15 includes a plurality of inner teeth 15a formed on an inner circumferential surface thereof. The link gear 15 is formed so as to partially intrude into the pipe 10 through the cutaway portion 10c of the pipe 10.

The link gear 15 includes a generally arcuate stopper 16 disposed in contact with a first (leading) one of the balls 12a in a normal state (while the pretensioner 8 is not activated) and having an outer peripheral edge of a predetermined circumferential length (corresponding to the pressure-receiving portion according to the present invention), and a plurality (in the first example, six) of generally triangular levers 17 (corresponding to the pressure-receiving portion according to the present invention), the stopper 16 and the levers 17 being formed so as to project from an outer circumferential surface of the link gear 15. The stopper 16 and all of the levers 17 can intrude into the pipe 10 through the cutaway portion 10c.

A pinion 19 is attached to a rotary shaft 18 of a locking base (not shown) of the seatbelt retractor 3, so as to rotate interlocked with the rotary shaft 18 (here, the pinion 19 may be attached to a rotary shaft of the spool (not shown) of the seatbelt retractor 3, so as to rotate interlocked with the rotary shaft). The locking base is employed in the conventionally known ELR and ALR. The locking base rotates, in the normal state, interlocked with the spool of the seatbelt retractor 3 that takes up the seatbelt 4, and is locked by a lock mechanism to be activated in the emergency case to thereby inhibit the rotation of the spool in the direction to withdraw the seatbelt. The ELR that employs the pretensioner including the plurality of balls and the locking base can be found, for example, in Japanese Unexamined Patent Application Publication No. 2001-233172, and hence detailed description of the locking base will not be made herein since the operation thereof can be understood from Japanese Unexamined Patent Application Publication No. 2001-233172 (incorporated by reference).

The pinion 19 includes a plurality of outer teeth 19a. The outer teeth 19a of the pinion 19 are to be engaged with the inner teeth 15a of the link gear 15. Once the pretensioner 8 is activated, the balls 12a press from above the stopper 16 and the levers 17 intruding in the pipe 10 through the cutaway portion 10c thereof, to thereby apply to the link gear 15 a rotational driving force in the seatbelt retracting direction (counterclockwise in FIG. 2) as well as a linear displacement force toward the pinion 19.

In a normal state, the link gear 15 is retained by shear pins 20 at a standby position shown in FIG. 2. While the link gear 15 is at the standby position the inner teeth 15a are not engaged with the outer teeth 19a, but spaced therefrom. In an emergency case, the pretensioner 8 is activated so that a pressing force originating from the pressure of the gas generated by the gas generator 14 is applied to the force transmission members 12, and the force transmission members 12 apply a rotational driving force and a linear displacement force to the link gear 15. Resultantly the shear pins 20 undergo a shear failure and the link gear 15 is moved to an operational position shown in FIG. 3(a). When the link gear 15 comes to the operational position, the inner teeth 15a are engaged with the outer teeth 19a. Accordingly, the link gear 15 and the pinion 19 (in other words, spool) are rotationally coupled, such that the rotary shaft 18, hence the spool, is caused to rotate in the seatbelt retracting direction through the plurality of force transmission members 12, the link gear 15, and the pinion 19 by the pressing force originating from the pressure of the gas generated by the gas generator 14. Thus, the plurality of force transmission members 12, the link gear 15, and the pinion 19 constitute the spool driving mechanism according to the present invention.

The gas generator 14 includes a case 14a of a stepped cylindrical shape, as shown in FIG. 4(a). A planar surface 14b is formed on an outer circumferential surface of an end portion of the case 14a on a gas-injecting side (lower end portion in FIG. 4(a)). An inner circumferential surface of the case 14a opposite the planar surface 14b may be similarly formed in a planar surface, or in a cylindrical shape.

As shown in FIG. 4(b), the gas generator mount 13 includes a planar portion 13a. An outer surface $13a_1$ and an inner surface $13a_2$ of the planar portion 10 are both formed in a planar surface as shown in FIGS. 4(c) and 4(d). The planar portion 13a includes a discharge hole 13b that allows communication between outside and inside of the gas generator mount 13 (in other words, pipe 10). When the gas generator 14 is fitted in the gas generator mount 13, at least a part of the planar surface 14b of the case 14a of the gas generator 14 and at least a part of the planar inner surface $13a_2$ of the gas generator mount 13 including the discharge hole 13b are disposed so as to oppose each other, as indicated by dash-dot-dot lines in FIG. 4(b).

As shown in FIGS. 4(a) to 4(d), a blocking member 25 formed of a metal such as iron or a resin in a thin flat plate of a predetermined shape (in this example, rectangular) is joined to the planar surface 14b of the case 14a of the gas generator 14, via an adhesive or the like (indicated by dash-dot-dot lines in FIGS. 4(a) and 4(b)). The blocking member 25 is located so as to oppose the entirety of the discharge hole 13b when the gas generator 14 is fitted in the gas generator mount 13. Accordingly, when the gas generator 14 is fitted in the gas generator mount 13 as shown in FIGS. 4(b) and 4(c), the outer surface of the blocking member 25 is brought into contact with the inner surface $13a_2$ of the gas generator mount 13 of the pipe 10, so as to block the discharge hole 13b from inside of the gas generator mount 13 (in other words, from inside of the pipe 10). Thus, the outer surface of the blocking member 25 constitutes a blocking surface $25b_1$ that blocks the discharge hole 13b.

On the other hand, when the blocking member 25 is pressed, while being disposed so as to block the discharge hole 13b, by a pressing device (not shown) such as a tool from outside of the gas generator mount 13 (outside of the pipe 10) through the discharge hole 13b, with a pressing force F equal to or greater than a predetermined pressing force as shown in FIG. 4(d), the discharge hole 13b is opened. To be more detailed, a predetermined region of the case 14a of the gas generator 14 including the portion where the blocking member 25 is attached is concavely deformed upon being pressed with the pressing force F equal to or greater than the predetermined pressing force, and the blocking member 25 is displaced while being deformed, so that the blocking surface $25b_1$ is separated from the inner surface $13a_2$ of the gas generator mount 13. Thus, the discharge hole 13b is opened so as to allow communication between outside and inside of the discharge hole 13b.

An operation of the pretensioner 8 configured as above according to the first example will now be described.

The operation of the pretensioner 8 according to the first example is basically the same as that of the conventional pretensioner that employs the plurality of ball, up to the stage where the spool of the seatbelt retractor 3 is caused to rotate in the seatbelt retracting direction in an emergency case.

While the pretensioner 8 remains unactivated, the link gear 15 is retained at the standby position as shown in FIG. 2. Accordingly, the inner teeth 15a of the link gear 15 are kept from being engaged with the outer teeth 19a of the pinion 19. Also, the first ball 12a is retained in contact with a lateral face 16a of the stopper 16 on an upstream side in the rotating direction of the link gear 15 (counterclockwise in FIG. 2, i.e., the seatbelt retracting direction). The subsequent balls 12a are sequentially in contact with the adjacent ones. In such a state, the gas generator 14 does not generate the gas and the balls 12a are substantially kept from applying a pressing force to the stopper 16 on the link gear 15. In addition, the discharge hole 13b is air-tightly blocked by the blocking member 25.

Once an emergency case has occurred, the pretensioner 8 is activated. More specifically, the gas generator 14 is activated so as to generate the gas, and the case 14a of the gas generator 14 expands outwardly owing to the pressure of the generated gas. The expansion of the case 14a brings the blocking surface $25b_1$ of the blocking member 25 into firm and close contact with the inner surface $13a_2$ of the gas generator mount 13. Accordingly, the discharge hole 13b becomes more air-tightly blocked by the blocking member 25.

The gas generated by the gas generator 14 opens up the gas injecting end face 14d of the case 14a and intrudes into the gas generator mount 13. At this stage, since the discharge hole 13b is air-tightly blocked by the blocking member 25, the gas inside of the gas generator mount 13 and the pipe 10 is inhibited from leaking out of the gas generator mount 13 and the pipe 10, and hence gas pressure loss is barely incurred.

Figure 3:
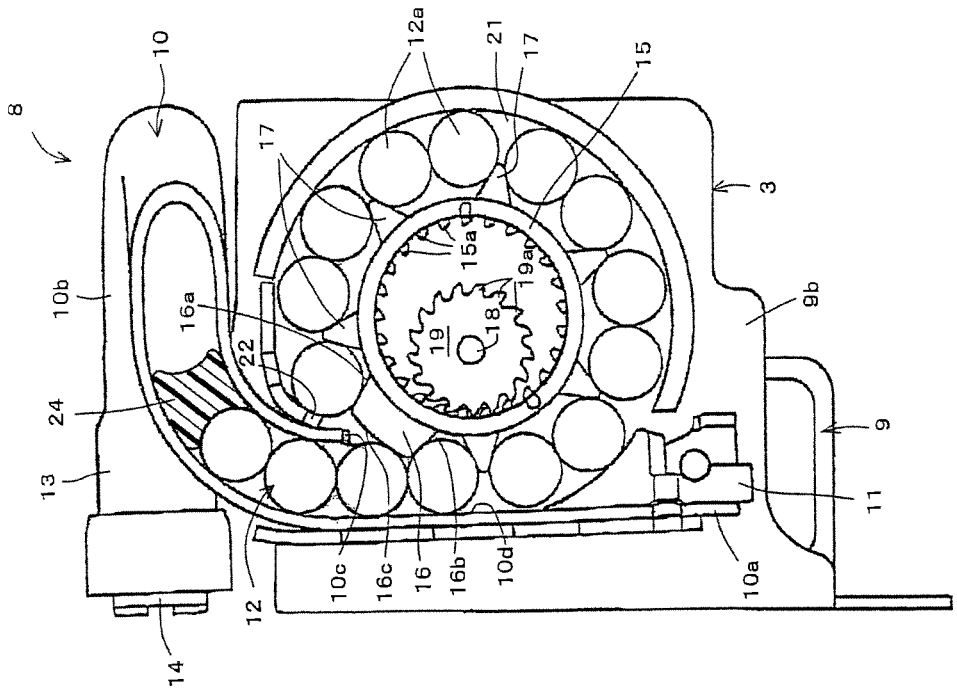
FIG. 3(a) is a partially cut away side view of the pretensioner according to the first example shown in FIG. 1 during an operation.
FIG. 3(b) showing a state of the pretensioner after the operation.
Figure 3:
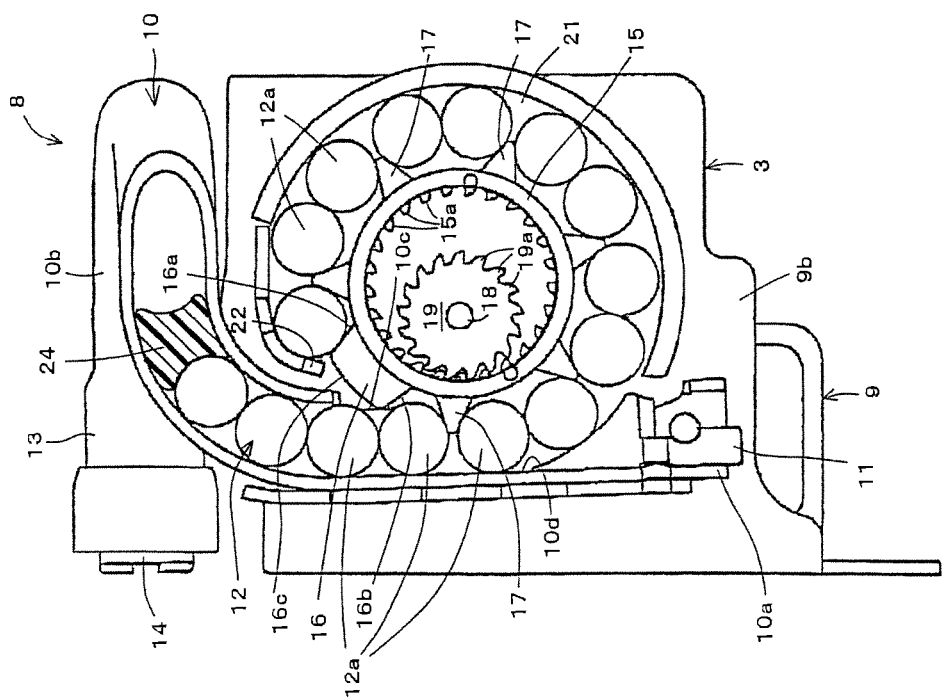

The gas in the gas generator mount 13 further proceeds into the pipe 10. The gas that has intruded into the pipe 10 applies a great pressing force to the balls 12a through a piston 24 (see FIG. 3(a)). Then the stopper 16 of the link gear 15 is pressed by the balls 12a, so that the shear pins 20 undergo a shear failure. Accordingly, the link gear 15 is displaced to the right in FIG. 2 and caused to rotate counterclockwise, by the pressing force applied through the balls 12a. The inner teeth 15a of the link gear 15 are then engaged with the outer teeth 19a of the pinion 19 as shown in FIG. 3(a), so that the pinion 19 starts to rotate in the same direction as the link gear 15. Thus, the rotary shaft 18 hence the spool starts to rotate in the seatbelt retracting direction, so that the seatbelt 4 worn by the occupant starts to be retracted.

Thereafter, the subsequent balls 12a sequentially press the levers 17 as shown in FIG. 3(a), which makes the link gear 15 and the pinion 19 rotate together in the seatbelt retracting direction (counterclockwise in FIG. 3(a)). Accordingly, the seatbelt 4 is taken up around the spool by a longer distance.

When a subsequent ball 12a starts to press the lever 17, the pressing force of the preceding ball 12 that pressed the lever 17 earlier becomes substantially ineffective. The balls 12 that have lost the pressing force move with the rotation of the link gear 15 along a guide groove 21. Then the first ball 12a comes into contact with a stopper 22 of the case body as shown in FIG. 3(a). At this stage, a lateral face 16b of the stopper 16 of the link gear 15 on a downstream side in the rotating direction of the link gear is not in contact with any of the opposing balls 12a.

When the first ball 12a comes into contact with the stopper 22, the stopper 22 is deformed by the pressing force of the first ball 12a as shown in FIG. 3(b), and the link gear 15 further rotates counterclockwise. Such deformation of the stopper 22 absorbs a part of the kinetic energy of the respective balls 12a. The additional counterclockwise rotation of the link gear 15 brings the outer peripheral edge 16c of the stopper 16 of the link gear 15 into contact with the opposing ball 12a as shown in FIG. 3(b), so that the ball 12a is detained between the outer peripheral edge 16c of the stopper 16 and the inner circumferential surface 10d of the pipe 10 opposite the cutaway portion 10c. Accordingly the link gear 15 stops rotating. Therefore the pinion 19 and the spool also stop rotating and the spool finishes taking up the seatbelt, and thus the operation of the pretensioner 8 is finished. The retracting action of the seatbelt 4 by the pretensioner 8 increases the restraining force of the seatbelt 4 with respect to the occupant.

At this stage, the volume of the space inside of the pipe 10 directly communicating with the inside of the gas generator mount 13 (space unoccupied with the balls 12a) is increased, and hence a residual gas pressure is present in the gas generator mount 13 and the pipe 10, although the residual gas pressure is somewhat lower than the peak pressure of the generated gas. Also, the discharge hole 13b remains air-tightly blocked by the blocking member 25 even after the operation of the pretensioner 8 is finished.

To discharge the gas from the gas generator mount 13 and the pipe 10 at a certain timing after the pretensioner 8 finishes the operation, the blocking member 25 is pressed with the pressing force F equal to or greater than the predetermined pressing force, as shown in FIG. 4(d). Then the blocking member 25 is deformed and displaced while causing deformation of the predetermined region of the gas generator mount 13 including the portion where the blocking member 25 is attached, thus to be separated from the inner surface $13a_2$ of the gas generator mount 13. Accordingly, the discharge hole 13b is opened and the gas inside of the pipe 10 flows out through the discharge hole 13b as indicated by an arrow a in FIG. 4(d), and the pressure in the gas generator mount 13 and the pipe 10 substantially returns to the atmospheric pressure. Here, although FIG. 4(d) illustrates such that the gas flows through the gap between the planar surface 14b, which is the outer surface of the case 14a on which the blocking member 25 is provided, and the inner surface $13a_2$ of the gas generator mount 13, actually the gas is discharged also through a gap between another portion of the outer surface of the case 14a and another portion of the inner surface of the gas generator mount 13.

The configuration of the remaining portions of the pretensioner 8 according to the first example, as well as the operation thereof, is substantially the same as those of the conventional pretensioner including the plurality of balls. Likewise, the configuration of the remaining portions of the seatbelt retractor 3 according to the first example, as well as the operation thereof, is substantially the same as those of the conventional ELR or ALR.

In the pretensioner 8 according to the first example, the gas generator mount 13 includes the discharge hole 13b, which is normally blocked by the blocking member 25 from inside of the gas generator mount 13. The discharge hole 13b can be opened after the operation of the pretensioner 8 is finished, by pressing the blocking member 25 from outside of the gas generator mount 13 through the discharge hole 13b with the pressing force F equal to or greater than the predetermined pressing force. Accordingly, the gas in the gas generator mount 13 and the pipe 10 can be easily discharged after the operation of the pretensioner 8 is finished, simply by pressing the blocking member 25 thereby opening the discharge hole 13b.

In particular, the generated gas serves to press the blocking member 25 in the direction to more firmly block the discharge hole 13b, and hence the blocking member 25 can more effectively block the discharge hole 13b during the operation of the pretensioner 8. Such an arrangement suppresses the pressure loss of the generated gas and allows the occupants to be more effectively restrained.

The seatbelt retractor 3 and the seatbelt unit 1 according to the first example allow the gas inside of the gas generator mount 13 and the pipe 10 to be easily discharged after the operation of the pretensioner 8, thereby enabling the vehicle such as an automobile including the pretensioner 8 that has been activated to be easily demolished so as to recycle the parts used in the vehicle.

Figure 5:
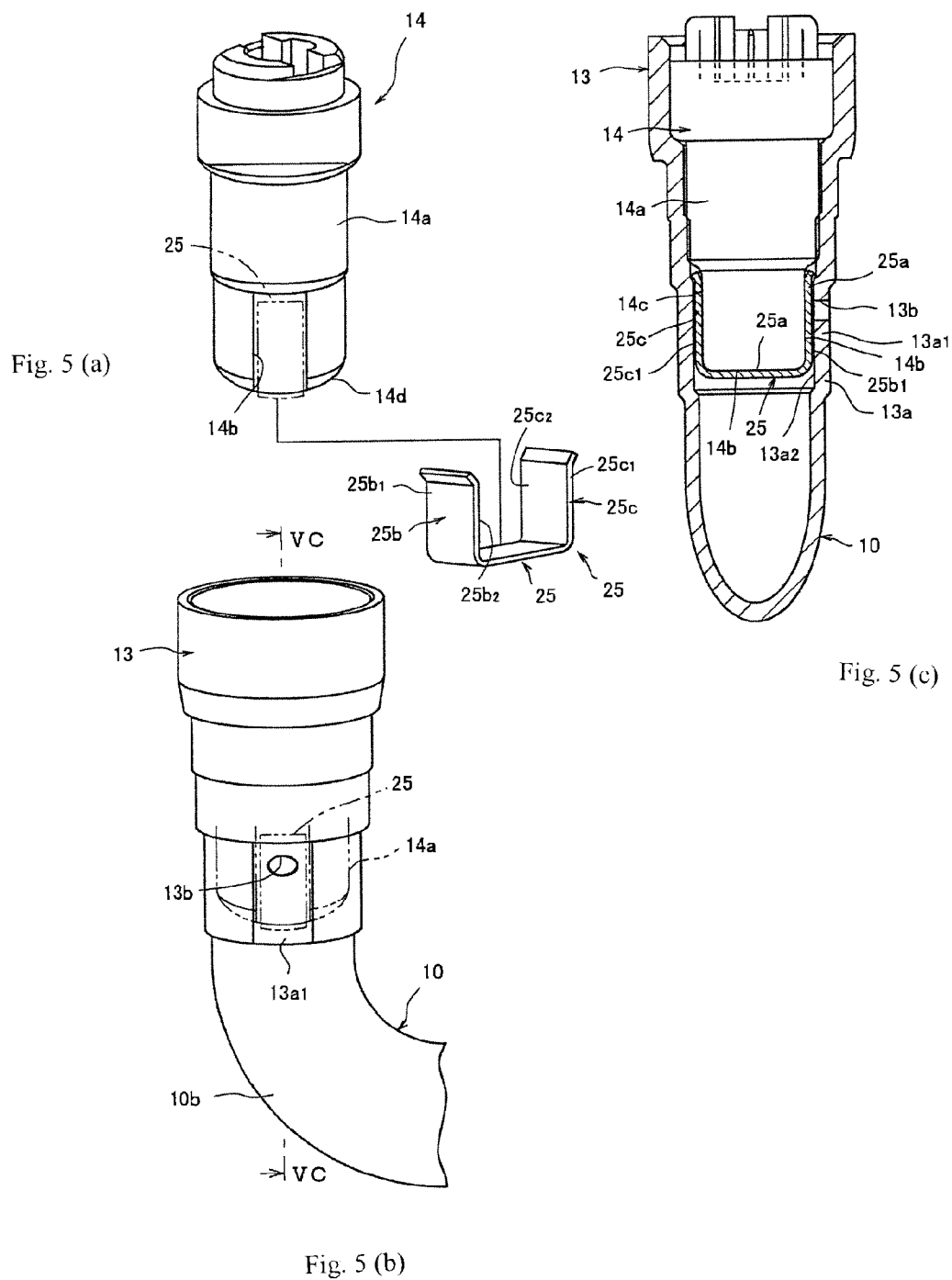
FIG. 5(a) is a schematic perspective view showing a gas generator and a blocking member according to a second example of the embodiment.
FIG. 5(b) is a perspective view showing a gas generator mount.
FIG. 5(c) is a cross-sectional view taken along a line VC-VC in FIG. 5(b)

FIG. 5 shows a pretensioner according to a second example of the embodiment of the present invention, FIG. 5(a) being a schematic perspective view showing a gas generator and a blocking member, FIG. 5(b) being a perspective view showing a gas generator mount, and FIG. 5(c) being a cross-sectional view taken along a line VC-VC in FIG. 5(b). In the subsequent description of examples of the embodiment, the same constituents will be given the same numeral, and detailed description thereof will not be repeated.

While the case 14a of the gas generator 14 includes a single planar surface 14b formed on the outer surface thereof in the pretensioner 8 according to the first example, a pair of planar surfaces 14b, 14c are provided in the pretensioner 8 according to the second example, as shown in FIGS. 5(a) to 5(c). In this case, the pair of planar surfaces 14b, 14c are symmetrically located with respect to the axial center of the cylindrical case 14a. In addition, the region of the case 14a where the pair of planar surfaces 14b, 14c are formed such that the outer surface and the inner surface thereof are parallel to each other.

Although the blocking member 25 of the pretensioner 8 according to the first example is formed of a thin plate, the blocking member 25 of the pretensioner 8 according to the second example is formed of a flat and thin strip-shaped plate as shown in FIGS. 5(a) and 5(c). In this case, the blocking member 25 is formed by bending the respective end portions of the strip-shaped plate, generally into a C-shape or U-shape in a side view, and includes a bottom portion 25a at the central portion and a pair of side walls 25b, 25c erected on the respective end portions of the bottom portion 25a. The pair of side walls 25b, 25c are elastic, and hence the blocking member 25 has a clipping function. The blocking member 25 is disposed such that the bottom portion 25a is in contact with the gas injecting end face 14d (lower end face in FIG. 4(a)) of the case 14a, and the side walls 25b, 25c are elastically in contact with the planar surfaces 14b, 14c of the case 14a respectively, because of the clipping function. Thus, the blocking member 25 is removably fitted to the case 14a. Accordingly, the respective outer surfaces of the side walls 25b, 25c (opposite the mutually opposing surfaces) constitute blocking surfaces $25b_1$, $25c_1$ that can block the discharge hole 13b. The respective inner surfaces of the side walls 25b, 25c (mutually opposing surfaces) constitute fitting surfaces $25b_2$, $25c_2$ to be brought into contact with the planar surfaces 14b, 14c of the case 14a. Although the blocking surface $25b_1$ of the side wall 25b blocks the discharge hole 13b in the second example, the blocking surface $25c_1$ of the opposing side wall 25c may be disposed so as to block the discharge hole 13b.

When the gas generator 14 is fitted in the gas generator mount 13 with the blocking member 25 fitted to the case 14a, one of the side walls 25b, 25c (side wall 25b in this example) of the blocking member 25 is disposed in contact with the planner inner surface $13a_2$ of the gas generator mount 13, so as to block the discharge hole 13b. In this case, since the side walls 25b, 25c of the blocking member 25 have the clipping function and are held between the outer surface of the case 14a of the gas generator 14 and the inner surface $13a_2$ of the gas generator mount 13, the blocking member 25 can be kept from coming off from the case 14a of the gas generator 14 in a normal state.

The configuration of the remaining portions of the pretensioner 8 according to the second example is the same as that of the first example.

In the pretensioner 8 configured as above according to the second example, the case 14a of the gas generator 14 expands outwardly owing to the pressure of the gas generated by the gas generator 14 once the pretensioner 8 is activated, so that the side wall 25b effectively comes into close contact with the inner surface $13a_2$ of the gas generator mount 13. Accordingly, the discharge hole 13b becomes more air-tightly blocked by the side wall 25b, and the gas is suppressed from leaking through the discharge hole 13b, resulting in reduced gas pressure loss.

Upon pressing the side wall 25b through the discharge hole 13b, as in the first example, with the pressing force F equal to or greater than the predetermined pressing force after the operation of the pretensioner 8 to thereby discharge the gas from the pipe 10 and the gas generator mount 13, the case 14a is concavely deformed and the side wall 25b is flexurally deformed, so that the side wall 25b is separated from the inner surface $13a_2$ of the gas generator mount 13. Accordingly, the discharge hole 13b is opened and the gas inside of the pipe 10 is outwardly discharged, and the pressure in the gas generator mount 13 and the pipe 10 returns to the atmospheric pressure.

The operations of other aspects of the pretensioner 8 according to the second example are the same as those of the first example. The second example offers substantially the same advantageous effects as those offered by the first example.

Further, the configuration of the remaining portions of the seatbelt retractor 3 including the pretensioner 8 according to the second example and the advantageous effects thereof, as well as the configuration of the remaining portions of the seatbelt unit 1 including the seatbelt retractor 3 according to the second example and the operation thereof, are substantially the same as those of the seatbelt retractor 3 and the seatbelt unit 1 according to the first example.

Figure 6:
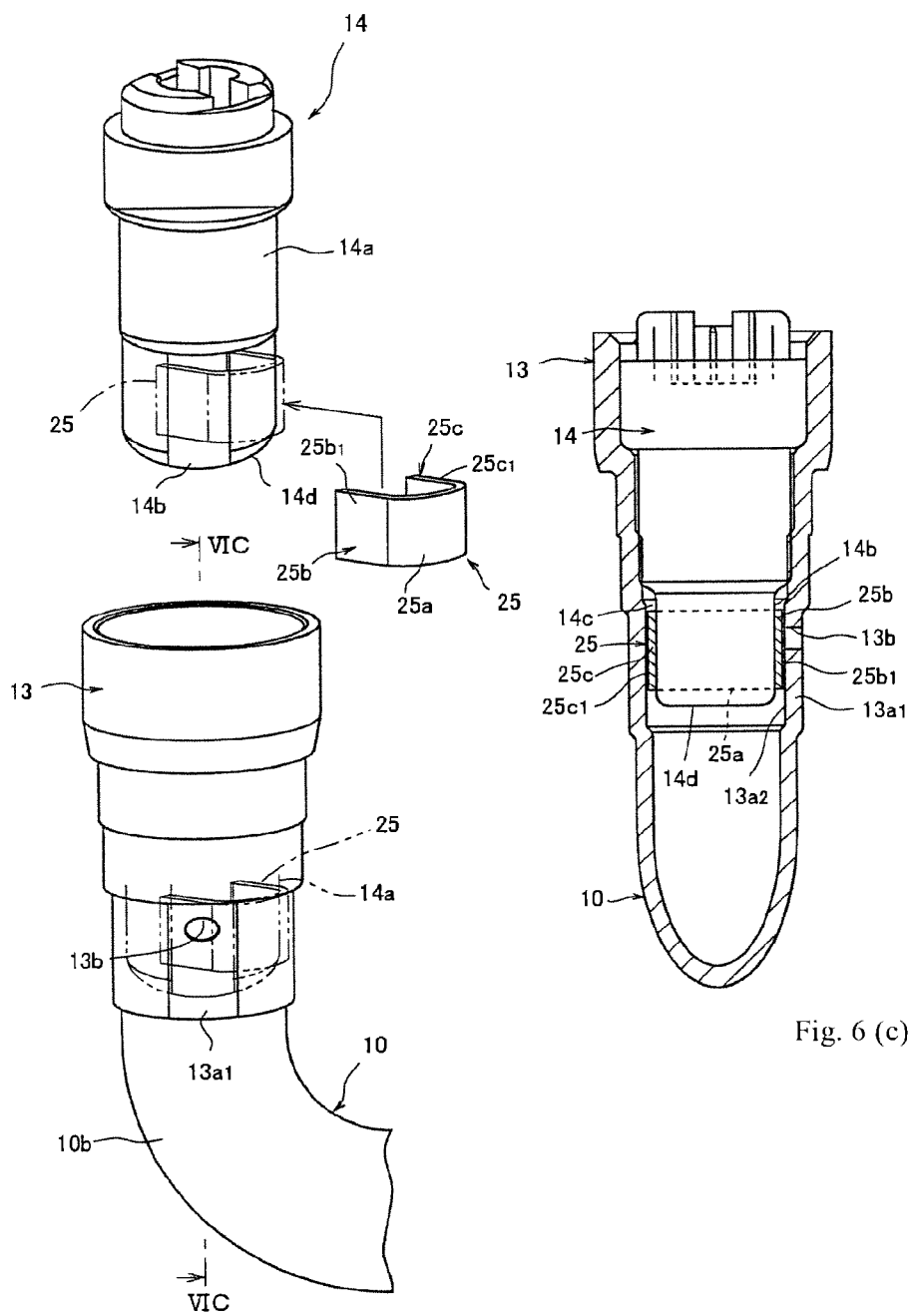
FIG. 6(a) is a schematic perspective view showing a gas generator and a blocking member according to a third example of the embodiment.
FIG. 6(b) is a perspective view showing a gas generator mount.
FIG. 6(c) is a cross-sectional view taken along a line VIC-VIC in FIG. 6(b)

FIG. 6 shows a pretensioner according to a third example of the embodiment of the present invention, FIG. 6(a) being a schematic perspective view showing a gas generator and a blocking member, FIG. 6(b) being a perspective view showing a gas generator mount, and FIG. 6(c) being a cross-sectional view taken along a line VIC-VIC in FIG. 6(b).

While the blocking member 25 of the pretensioner 8 according to the second example is formed by bending the respective end portions of the strip-shaped plate, generally into a C-shape or U-shape in a side view, the blocking member 25 of the pretensioner 8 according to the third example is formed by bending the central bottom portion 25a of the blocking member 25 in a curved shape, generally into a C-shape (or U-shape) in a side view as shown in FIGS. 6(a) to 6(c). The respective side walls 25b, 25c of the blocking member 25 according to the third example also have the clipping function. As shown in FIG. 6(a), the blocking member 25 is removably and elastically fitted to the case 14a from a lateral direction. In this state, the inner surface of the curved bottom portion 25a comes into contract with the arcuate outer circumferential surface of the case 14a.

The operation and the advantageous effects of the pretensioner 8 according to the third example are substantially the same as those of the second example.

Further, the configuration of the remaining portions of the seatbelt retractor 3 including the pretensioner 8 according to the third example and the advantageous effects thereof, as well as the configuration of the remaining portions of the seatbelt unit 1 including the seatbelt retractor 3 according to the third example and the operation thereof, are substantially the same as those of the seatbelt retractor 3 and the seatbelt unit 1 according to the first example.

Figure 7:
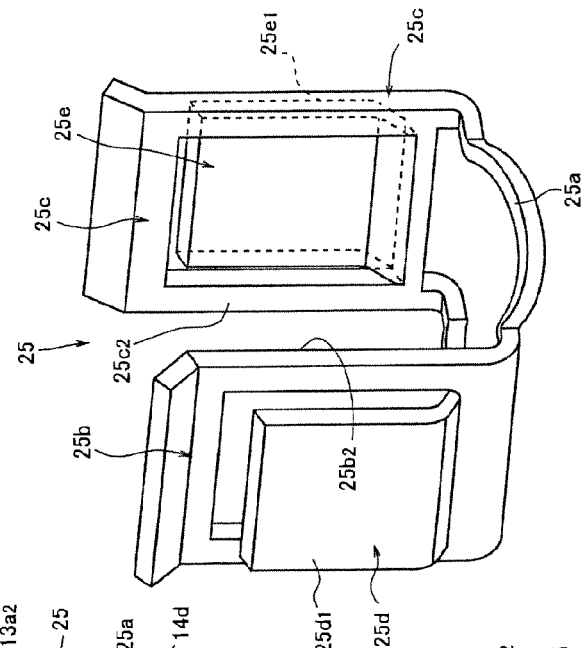
FIG. 7(a) is a schematic perspective view showing a blocking member used in the pretensioner according to a fourth example of the embodiment.
FIG. 7(b) is an enlarged fragmentary cross-sectional view similar to a part of FIG. 5(c) partially showing a state where the gas generator is mounted.
FIG. 7(c) is an enlarged fragmentary cross-sectional view of a portion VIIC in FIG. 7(b)
Figure 7:
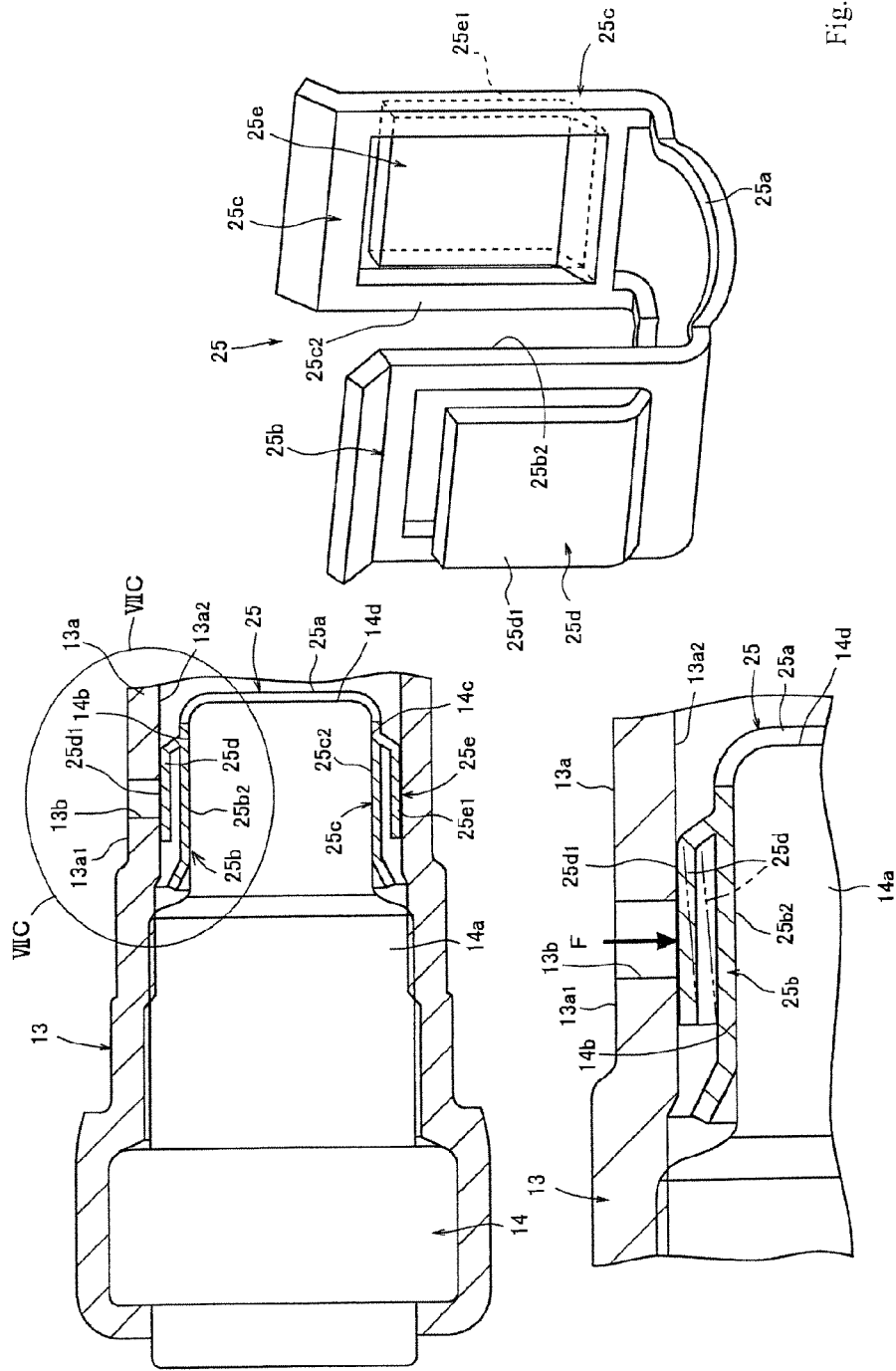
Figure 7:
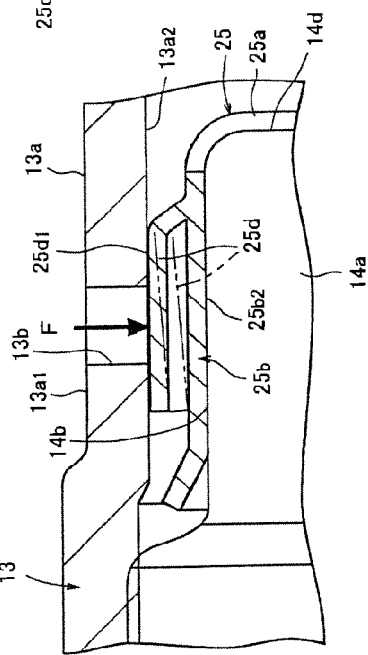

FIG. 7 shows a pretensioner according to a fourth example of the embodiment of the present invention, FIG. 7(*a*) being a schematic perspective view showing a blocking member used in the pretensioner according to the fourth example, FIG. 7(*b*) being an enlarged fragmentary cross-sectional view similar to a part of FIG. 5(*c*) partially showing a state where the gas generator is mounted, and FIG. 7(*c*) being an enlarged fragmentary cross-sectional view of a portion VIIC in FIG. 7(*b*).

While the side walls 25*b*, 25*c* of the blocking member 25 respectively include the blocking surfaces $25b_1$, $25c_1$ on the outer side and the fitting surfaces $25b_2$, $25c_2$ (see FIG. 5(*a*)) on the inner side in the pretensioner 8 according to the second example, the side walls 25*b*, 25*c* respectively include only the fitting surfaces $25b_2$, $25c_2$ on the inner side in the pretensioner 8 according to the fourth example, as shown in FIGS. 7(*a*) to 7(*c*). In other words, the side walls 25*b*, 25*c* serve as fitting portions via which the blocking member 25 is to be supported by the case 14*a*.

Further, in the pretensioner 8 according to the fourth example, the side walls 25*b*, 25*c* are partially cut and the cut portion is outwardly bent so as to form blocking portions 25*d*, 25*e*. The blocking portions 25*d*, 25*e* are formed parallel or substantially parallel to the respectively corresponding side walls 25*b*, 25*c*. The respective outer surfaces of the blocking portions 25*d*, 25*e* serve as blocking surfaces $25d_1$, $25e_1$. In the blocking member 25 according to the fourth example also, the side walls 25*b*, 25*c* and the blocking portions 25*d*, 25*e* have the clipping function.

The configuration of the remaining portions of the pretensioner 8 according to the fourth example is substantially the same as that of the second example.

The blocking member 25 is removably fitted to the case 14*a* of the gas generator 14 such that the fitting surfaces $25b_2$, $25c_2$ of the side walls 25*b*, 25*c* are elastically in contact with the planar surfaces 14*b*, 14*c* of the case 14*a*. When the gas generator 14 is fitted in the gas generator mount 13, the blocking surface $25d_1$ of one of the blocking portions 25*d*, 25*e* (blocking portion 25*d* in this example) is separably disposed in contact with the planner inner surface $13a_2$ of the gas generator mount 13, so as to block the discharge hole 13*b*.

When the gas generator 14 generates the gas in an emergency case, the case 14*a* expands owing to the pressure of the gas, so that the blocking surface $25d_1$ of the blocking portion 25*d* is pressed against the inner surface $13a_2$ of the gas generator mount 13. Accordingly, the blocking portion 25*d* effectively comes into close contact with the inner surface $13a_2$, so that the discharge hole 13*b* becomes more air-tightly blocked.

Upon pressing the blocking surface $25d_1$ through the discharge hole 13*b*, as in the foregoing examples, with the pressing force F equal to or greater than the predetermined pressing force after the operation of the pretensioner 8 to thereby discharge the gas from the pipe 10, the blocking portion 25*d* is flexurally deformed so that the blocking surface 25*d*, is separated from the inner surface $13a_2$ of the gas generator mount 13, as indicated by dash-dot-dot lines in FIG. 7(*c*). Accordingly, the discharge hole 13*b* is opened and the gas inside of the pipe 10 and the gas generator mount 13 is outwardly discharged, and the pressure in the gas generator mount 13 and the pipe 10 returns to the atmospheric pressure. Here, the blocking portion 25*d* may be flexurally deformed while causing the case 14*a* of the gas generator 14 to be concavely deformed.

Providing the fitting portions 25*b*, 25*c* and the blocking portions 25*d*, 25*e* separately from each other as in the pretensioner 8 according to the fourth example enables the fitting portions to more effectively retain the blocking member 25, and allows the blocking portions 25*d*, 25*e* to more effectively block the discharge hole 13*b*.

The operation and the advantageous effects of the pretensioner 8 according to the fourth example are substantially the same as those of the second example.

Further, the configuration of the remaining portions of the seatbelt retractor 3 including the pretensioner 8 according to the fourth example and the advantageous effects thereof, as well as the configuration of the remaining portions of the seatbelt unit 1 including the seatbelt retractor 3 according to the fourth example and the operation thereof, are substantially the same as those of the seatbelt retractor 3 and the seatbelt unit 1 according to the first example.

Figure 8:
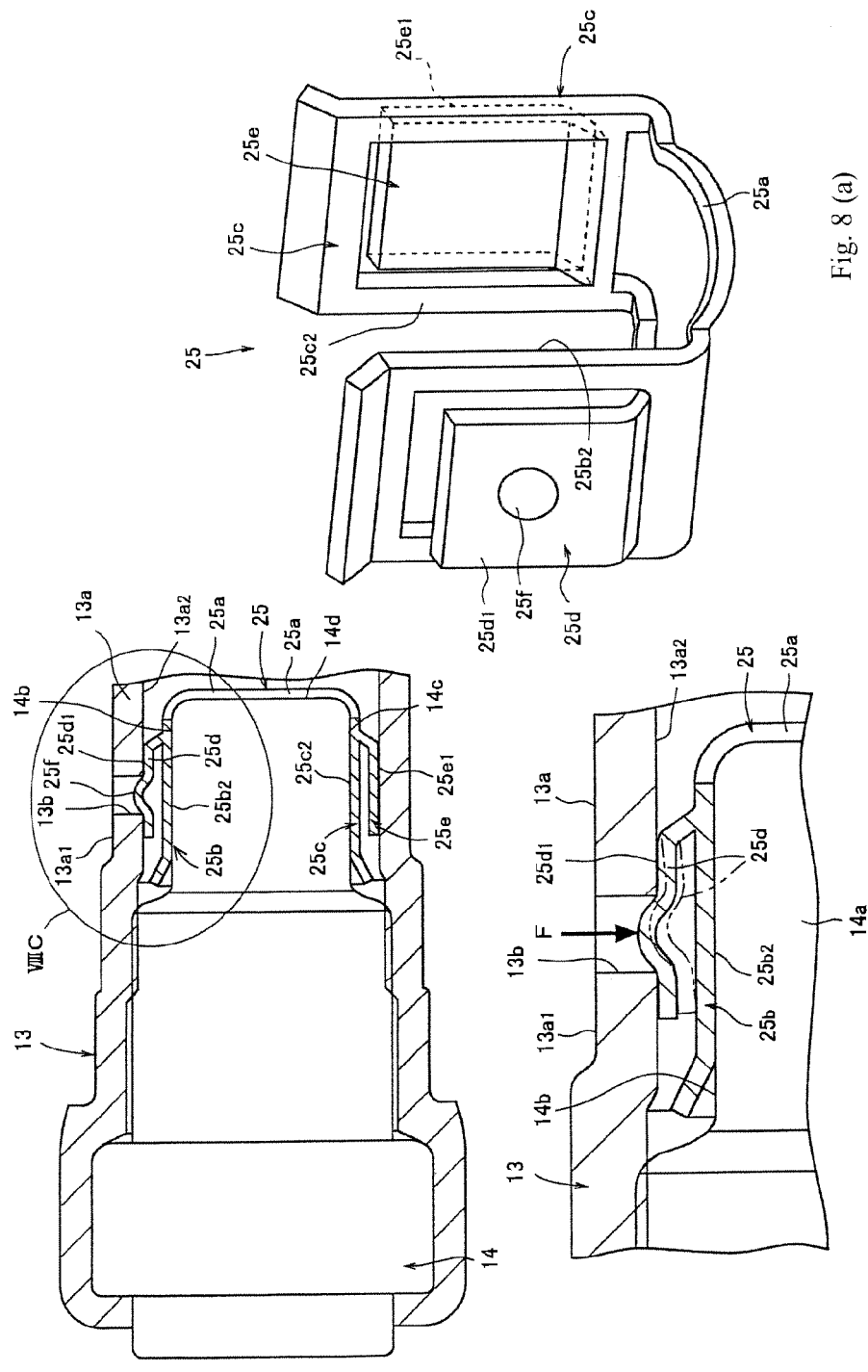
FIG. 8(a) is a schematic perspective view showing a blocking member used in the pretensioner according to a fifth example of the embodiment.
FIG. 8(b) is an enlarged fragmentary cross-sectional view similar to FIG. 7(b) partially showing a state where the gas generator is mounted.
FIG. 8(c) is an enlarged fragmentary cross-sectional view of a portion VIIIC in FIG. 8(b)

FIG. 8 shows a pretensioner according to a fifth example of the embodiment of the present invention, FIG. 8(*a*) being a schematic perspective view showing a blocking member used in the pretensioner according to the fifth example, FIG. 8(*b*) being an enlarged fragmentary cross-sectional view similar to FIG. 7(*b*) partially showing a state where the gas generator is mounted, and FIG. 8(*c*) being an enlarged fragmentary cross-sectional view of a portion VIIIC in FIG. 8(*b*).

In the pretensioner 8 according to the fifth example, as shown in FIGS. 8(*a*) to 8(*c*), one of the blocking portions 25*d*, 25*e* according to the fourth example that is disposed so as to block the discharge hole 13*b* includes a blocking projection 25*f* formed so as to outwardly protrude, such that a portion thereof can intrude into the discharge hole 13*b*. The blocking projection 25*f* is formed in a semispherical or substantially semispherical shape.

The configuration of the remaining portions of the pretensioner 8 according to the fifth example is substantially the same as that of the fourth example.

When the gas generator 14 is fitted in the gas generator mount 13, the blocking projection 25*f* formed on one of the blocking portions (blocking portion 25*d* in this example) intrudes into the discharge hole 13*b* and a portion of the blocking surface $25d_1$ peripheral to the base portion of the blocking projection 25*f* comes into contact with the planner inner surface $13a_2$ of the gas generator mount 13, so as to block the discharge hole 13*b*. Once the gas generator 14 generates the gas, the blocking surface $25d_1$ of the blocking portion 25*d* is effectively brought into close contact with the inner surface $13a_2$ by the gas pressure, so that the discharge hole 13*b* is more air-tightly blocked, as in the foregoing examples. Here, the blocking projection 25*f* intruding into the discharge hole 13*b* further ensures the air-tight blocking effect of the discharge hole 13*b*.

In the case of the fifth example, the blocking projection 25*f* is pressed through the discharge hole 13*b* with the pressing force F equal to or greater than the predetermined pressing force after the operation of the pretensioner 8 to thereby discharge the gas from the pipe 10, instead of the blocking surface $25d_1$ as in the foregoing examples. As a result, the blocking portion 25*d* is flexurally deformed and the discharge hole 13*b* is opened.

The operation and the advantageous effects of the pretensioner 8 according to the fifth example are substantially the same as those of the fourth example.

Further, the configuration of the remaining portions of the seatbelt retractor 3 including the pretensioner 8 according to the fifth example and the advantageous effects thereof, as well as the configuration of the remaining portions of the seatbelt unit 1 including the seatbelt retractor 3 according to the fifth example and the operation thereof, are substantially the same as those of the seatbelt retractor 3 and the seatbelt unit 1 according to the first example.

Figure 9:
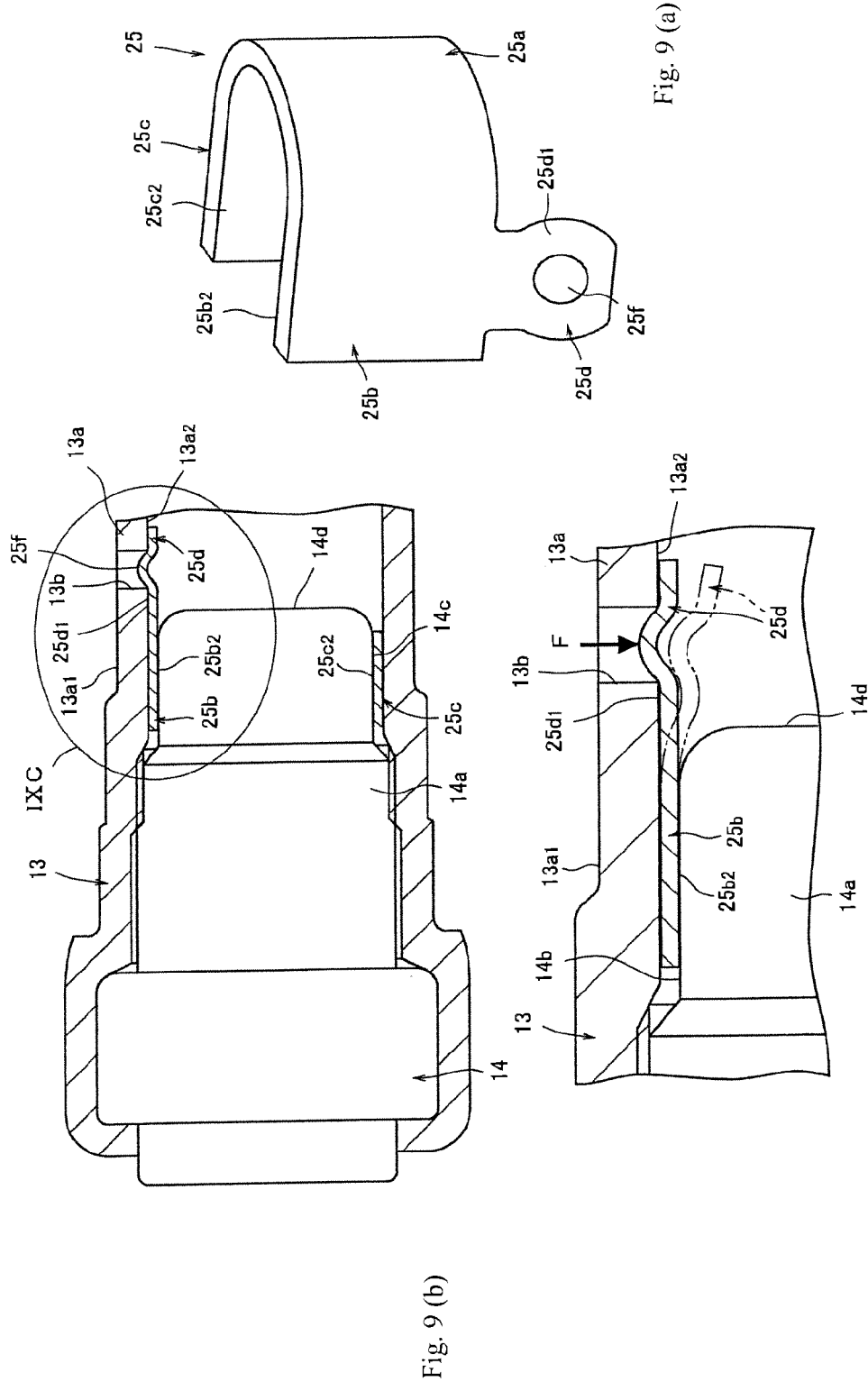
FIG. 9(a) is a schematic perspective view showing a blocking member used in the pretensioner according to a sixth example of the embodiment.
FIG. 9(b) is an enlarged fragmentary cross-sectional view similar to FIG. 7(b) partially showing a state where the gas generator is mounted.
FIG. 9(c) is an enlarged fragmentary cross-sectional view of a portion IXC in FIG. 9(b)

FIG. 9 shows a pretensioner according to a sixth example of the embodiment of the present invention, FIG. 9(a) being a schematic perspective view showing a blocking member used in the pretensioner according to the sixth example, FIG. 9(b) being an enlarged fragmentary cross-sectional view similar to FIG. 7(b) partially showing a state where the gas generator is mounted, and FIG. 9(c) being an enlarged fragmentary cross-sectional view of a portion IXC in FIG. 9(b).

As shown in FIGS. 9(a) to 9(c), in the pretensioner 8 according to the sixth example the blocking member 25 includes the pair of side walls 25b, 25c serving as the fitting portion, and the blocking portion 25d, as in the pretensioner 8 according to the fifth example. While the pair of blocking portions 25d, 25e are provided in the fifth example, just the single blocking portion 25d is provided in the sixth example. However, the pair of blocking portions 25d, 25e may be provided in the sixth example. The following description is based on the assumption that only the blocking portion 25d is provided.

In this case, in the pretensioner 8 according to the sixth example the pair of side walls 25b, 25c are connected via the bottom portion 25a formed in a curved shape as in the third example shown in FIG. 6, and have the clipping function. Now, in the fifth example the pair of blocking portions 25d, 25e are formed so as to outwardly protrude from the respectively corresponding side walls 25b, 25c; in other words the pair of blocking portions 25d, 25e and the respectively corresponding side walls 25b, 25c are formed in different planes. In contrast, in the pretensioner 8 according to the sixth example the blocking portion 25d is formed on the same or substantially the same plane as the side wall 25b, in a direction orthogonal or substantially orthogonal to the curving direction of the blocking member 25.

The blocking member 25 is removably fitted to the case 14a from a lateral direction as the blocking member of the third example, such that the pair of side walls 25b, 25c are oriented orthogonal to the longitudinal direction of the gas generator 14. When the gas generator 14 is fitted in the gas generator mount 13, the blocking projection 25f of the blocking portions 25d intrudes into the discharge hole 13b and a portion of the blocking surface $25d_1$ peripheral to the base portion of the blocking projection 25f comes into contact with the planner inner surface $13a_2$ of the gas generator mount 13, so as to block the discharge hole 13b. In this case, the respective outer surfaces of the side walls 25b, 25c also come into contact with the planar inner surface $13a_2$ of the gas generator mount 13, in the sixth example. Alternatively, the respective outer surfaces of the side walls 25b, 25c may be formed so as to be spaced from the inner surface $13a_2$ of the gas generator mount 13.

The configuration of the remaining portions of the pretensioner 8 according to the sixth example is substantially the same as that of the fifth example.

In the case of the sixth example, the blocking projection 25f is pressed through the discharge hole 13b with the pressing force F equal to or greater than the predetermined pressing force after the operation of the pretensioner 8 to thereby discharge the gas from the pipe 10, instead of the blocking surface $25d_1$ as in the foregoing examples. As a result, the blocking portion 25d is flexurally deformed and the discharge hole 13b is opened. In this case in the sixth example, although the blocking portion 25d is flexurally deformed the side wall 25b is barely deformed.

The operation and the advantageous effects of the pretensioner 8 according to the sixth example are substantially the same as those of the fifth example.

Further, the configuration of the remaining portions of the seatbelt retractor 3 including the pretensioner 8 according to the sixth example and the advantageous effects thereof, as well as the configuration of the remaining portions of the seatbelt unit 1 including the seatbelt retractor 3 according to the sixth example and the operation thereof, are substantially the same as those of the seatbelt retractor 3 and the seatbelt unit 1 according to the first example.

Figure 10:
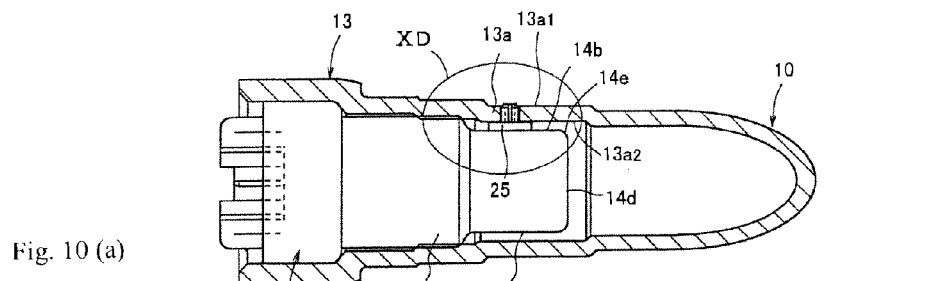
FIG. 10(a) is a cross-sectional view similar to FIG. 4(c) in the pretensioner according to a seventh example of the embodiment.
FIG. 10(b) being a front view of a blocking member.
FIG. 10(c) is a cross-sectional view taken along a line XC-XC in FIG. 10(b) for explaining an operation.
FIG. 10(d) is an enlarged fragmentary cross-sectional view of a portion XD in FIG. 10(a)
FIG. 10(e) is a front view showing a variation of the seventh example.
FIG. 10(f) is a right side view of FIG. 10(e).
Figure 10:
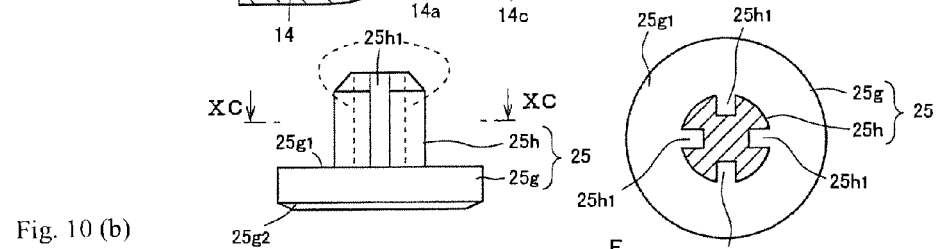
Figure 10:
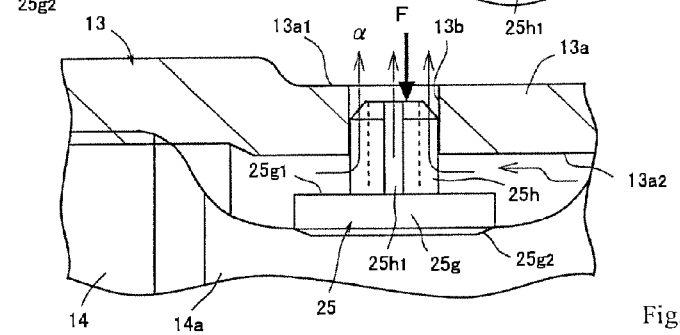
Figure 10:
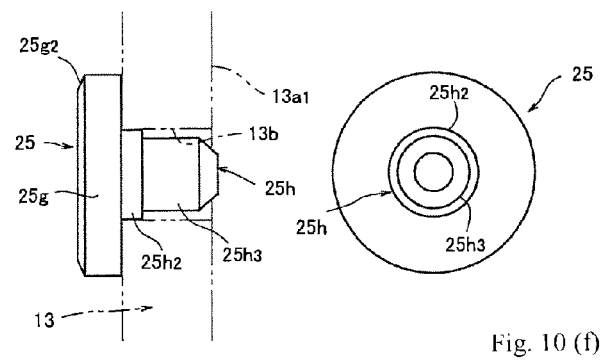

FIG. 10 shows a pretensioner according to a seventh example of the embodiment of the present invention, FIG. 10(a) being a cross-sectional view similar to FIG. 4(c), FIG. 10(b) being a front view of a blocking member, FIG. 10(c) being a cross-sectional view taken along a line XC-XC in FIG. 10(b) for explaining an operation, FIG. 10(d) being an enlarged fragmentary cross-sectional view of a portion XD in FIG. 10(a), FIG. 10(e) being a front view showing a variation of the seventh example, and FIG. 10(f) being a right side view of FIG. 10(e).

While the blocking member 25 according to the first example is formed of the thin plate attached to the case 14a, the blocking member 25 of the pretensioner 8 according to the seventh example is formed in a pin shape including a disk-shaped head portion 25g and a shaft portion 25h formed projecting from the center of the head portion 25g so as to be fitted in the discharge hole 13b, as shown in FIGS. 10(a) and 10(b). The shaft portion 25h has a diameter substantially the same as that of the discharge hole 13b. The head portion 25g has an outer diameter larger than the diameter of the discharge hole 13b. When the blocking member 25 is fitted in the gas generator mount 13, the surface of the head portion 25g from which the shaft portion 25h is projecting serves as a blocking surface $25g_1$ disposed in close contact with the inner surface $13a_2$ of the gas generator mount 13 so as to block the discharge hole 13b.

The head portion 25g includes a chamfered portion $25g_2$ formed along the peripheral edge of the surface thereof opposite the blocking surface $25g_1$. The shaft portion 25h includes a predetermined number (in this example, four) of discharge grooves $25h_1$ formed on the outer circumferential surface thereof so as to extend in an axial direction.

When the gas generator 14 is to be fitted in the gas generator mount 13, the blocking member 25 is first attached to the gas generator mount 13 as shown in FIG. 10(a). More specifically, the shaft portion 25h of the blocking member 25 is fitted in the discharge hole 13b and the blocking surface $25g_1$ is brought into contact with the inner surface $13a_2$ of the gas generator mount 13. With the blocking member 25 thus fitted, the gas generator 14 is then inserted in the gas generator mount 13 from the left in FIG. 10(a) to be fitted therein. In this case, despite the blocking member 25 having been attached in advance, the gas generator 14 can be relatively smoothly fitted because of an interaction between a rounded portion 14e formed on the gas injecting end portion of the case 14a of the gas generator 14 and the chamfered portion $25g_2$ of the head portion 25g.

The configuration of the remaining portions of the pretensioner 8 according to the seventh example is substantially the same as that of the first example.

When the gas generator 14 is fitted in the gas generator mount 13, the blocking surface $25g_1$ of the blocking member 25 is brought into contact with the planar inner surface $13a_2$ of the gas generator mount 13, so as to block the discharge hole 13b. As in the foregoing examples, when the case 14a expands owing to the pressure of the gas generated by the gas generator 14, the blocking surface $25g_1$ of the blocking member 25 is effectively brought into close contact with the inner surface $13a_2$ of the gas generator mount 13, so that the blocking member 25 more air-tightly blocks the discharge hole 13b.

To discharge the gas from the pipe 10 after the operation of the pretensioner 8, the shaft portion 25h is pressed through the discharge hole 13b with the pressing force F equal to or greater than the predetermined pressing force, as shown in FIG. 10(d). As a result, the blocking member 25 is displaced while concavely deforming the case 14a so as to separate the blocking surface $25g_1$ from the inner surface $13a_2$, and the discharge hole 13b is opened through the discharge grooves $25h_1$.

The operation and the advantageous effects of the pretensioner 8 according to the seventh example are substantially the same as those of the first example.

Further, the configuration of the remaining portions of the seatbelt retractor 3 including the pretensioner 8 according to the seventh example and the advantageous effects thereof, as well as the configuration of the remaining portions of the seatbelt unit 1 including the seatbelt retractor 3 according to the seventh example and the operation thereof, are substantially the same as those of the seatbelt retractor 3 and the seatbelt unit 1 according to the first example.

Alternatively, as shown in FIGS. 10(e) and 10(f), the shaft portion 25h may be formed in a stepped shape including a major diameter portion $25h_2$ having an outer diameter substantially the same as the diameter of the discharge hole 13b and a minor diameter portion $25h_3$ smaller in diameter than the major diameter portion $25h_2$. In a normal state both the major diameter portion $25h_2$ and the minor diameter portion $25h_3$ are fitted in the discharge hole 13b, so that the blocking member 25 is stably attached to the gas generator mount 13. When the gas is to be discharged, the blocking member 25 is pressed with the pressing force F equal to or greater than the predetermined pressing force until at least the major diameter portion $25h_2$ becomes disengaged from the discharge hole 13b, so that the gas can flow out through the gap between the outer circumferential surface of the minor diameter portion $25h_3$ and the inner circumferential surface of the discharge hole 13b. In this case, therefore, it is not necessary to form the discharge groove $25h_1$ on the shaft portion 25h.

Alternatively, the shaft portion 25h may be solely formed of the major diameter portion $25h_2$, in other words in a shorter axial length than the shaft portion 25h shown in FIGS. 10(a) to 10(d). In this case, when the blocking member 25 is pressed with the pressing force F equal to or greater than the predetermined pressing force the shaft portion 25h is entirely removed from the discharge hole 13b so as to open the discharge hole 13b. Further, the shaft portion 25h may be solely formed of the minor diameter portion $25h_3$, instead of the stepped shape.

It is to be understood that the pretensioner and the seatbelt retractor according to the present invention are in no way limited to the foregoing examples, but various modifications may be made. For example, although the pipe 10 and the gas generator mount 13 are formed of a single material such that the base end portion 10b of the pipe 10 is formed as the gas generator mount 13 in the foregoing examples, the pipe 10 and the gas generator mount 13 may be separately formed and then air-tightly and integrally coupled.

The spool driving mechanism is not limited to the combination of the plurality of force transmission members 12, the link gear 15, and the pinion 19 according to the foregoing examples, but any mechanisms including a rack and pinion mechanism may be employed, as long as the mechanism allows the spool to rotate in the seatbelt retracting direction with the pressure of the gas generated in the pipe 10 by the gas generator 14.

Further, the discharge hole 13b may be located in the pipe 10 at a position between the gas generator 14 and the force transmission member 12, instead of in the gas generator mount 13.

Further, it is not mandatory to provide the arcuate stopper 16 on the link gear 15, and the pretensioner according to JP-A-2001-63520 or the pretensioner according to JP-A-2001-233172 may instead be employed.

To summarize, the present invention is applicable to any pretensioner within the scope defined in the appended claims, provided that the pretensioner includes a gas generator that generates a gas in an emergency case.

The pretensioner, the seatbelt retractor, and the seatbelt unit according to the present invention are suitably applicable to a pretensioner that includes a gas generator to be activated so as to generates a gas at an initial stage of an emergency case, a seatbelt retractor configured to retract the seatbelt in cooperation with the pretensioner, and a seatbelt unit configured to restrain an occupant by using the seatbelt retractor in the emergency case.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

The invention claimed is:

1. A pretensioner comprising:
 a pipe;
 a gas generator that generates a gas in the pipe in an emergency case;
 a gas generator mount on which the gas generator is mounted;
 a spool driving mechanism that rotates a spool in a direction to retract a seatbelt by the gas generated by the gas generator in the emergency case;
 a discharge hole formed in the pipe so as to allow communication between inside and outside of the pipe; and
 a blocking member configured to block the discharge hole from inside of the pipe, the blocking member being configured to open the discharge hole when the blocking member is pressed from outside of the pipe with a pressing force equal to or greater than a given pressing force; and
 wherein the blocking member is formed of a thin plate attached to a case of the gas generator.

2. The pretensioner according to claim 1,
 wherein the spool driving mechanism comprises:
 a plurality of force transmission members that generates and transmits a force for causing the spool to rotate in the direction to retract the seatbelt by using the gas;
 a link gear that is at least rotatable and includes a plurality of inner teeth provided on an inner circumferential portion thereof and a pressure-receiving portion provided on an outer circumferential portion thereof; and
 a pinion provided on a member associated with the spool and including outer teeth to be engaged with the inner teeth so as to rotate the spool.

3. The pretensioner according to claim 1,
 wherein the blocking member comprises:
 a head portion having a blocking surface that blocks the discharge hole; and a shaft portion formed so as to project from the head portion and to intrude into the discharge hole, wherein the discharge hole is opened by pressing the shaft portion with the pressing force from outside of the gas generator mount, so as to displace the blocking member.

4. A seatbelt retractor comprising:

the pretensioner according to claim 1, wherein the spool reels the seatbelt.

5. A seatbelt unit comprising:

the seatbelt retractor according to claim 4;

a tongue slidably supported by the seatbelt; and a buckle provided on a vehicle, wherein the tongue is removably engaged with the buckle.

6. A pretensioner comprising:

a pipe;

a gas generator that generates a gas in the pipe in an emergency case;

a gas generator mount on which the gas generator is mounted;

a spool driving mechanism that rotates a spool in a direction to retract a seatbelt by the gas generated by the gas generator in the emergency case;

a discharge hole formed in the pipe so as to allow communication between inside and outside of the pipe; and a blocking member configured to block the discharge hole from inside of the pipe, the blocking member being configured to open the discharge hole when the blocking member is pressed from outside of the pipe with a pressing force equal to or greater than a given pressing force; and wherein the blocking member is fitted to a case of the gas generator so as to be supported, by using a clipping function.

7. The pretensioner according to claim 6, wherein the blocking member is fitted to the case of the gas generator so as to be supported, in a longitudinal direction of the case from an end portion thereof on a gas-injecting side.

8. The pretensioner according to claim 6, wherein the blocking member is fitted to a lateral face of the case of the gas generator so as to be supported.

9. The pretensioner according to claim 6, wherein the blocking member comprises:

a fitting portion to be fitted to the case of the gas generator so as to be supported; and a blocking portion that blocks the discharge hole, the fitting portion and the blocking portion being separately formed, wherein the fitting portion is fitted to the case so as to be supported, in a longitudinal direction of the case from the end portion thereof on the gas-injecting side.

10. The pretensioner according to claim 9, wherein the blocking portion is provided in a plane different from a plane in which the fitting portion is provided.

11. The pretensioner according to claim 9, wherein the blocking portion and the fitting portion are provided in the same plane.

12. The pretensioner according to claim 10, wherein the blocking portion includes a blocking projection formed so as to intrude into the discharge hole.

\* \* \* \* \*